E. TOBIESSEN.
MOTOR CONTROLLER.
APPLICATION FILED JULY 24, 1915.
1,279,790.
Patented Sept. 24, 1918.
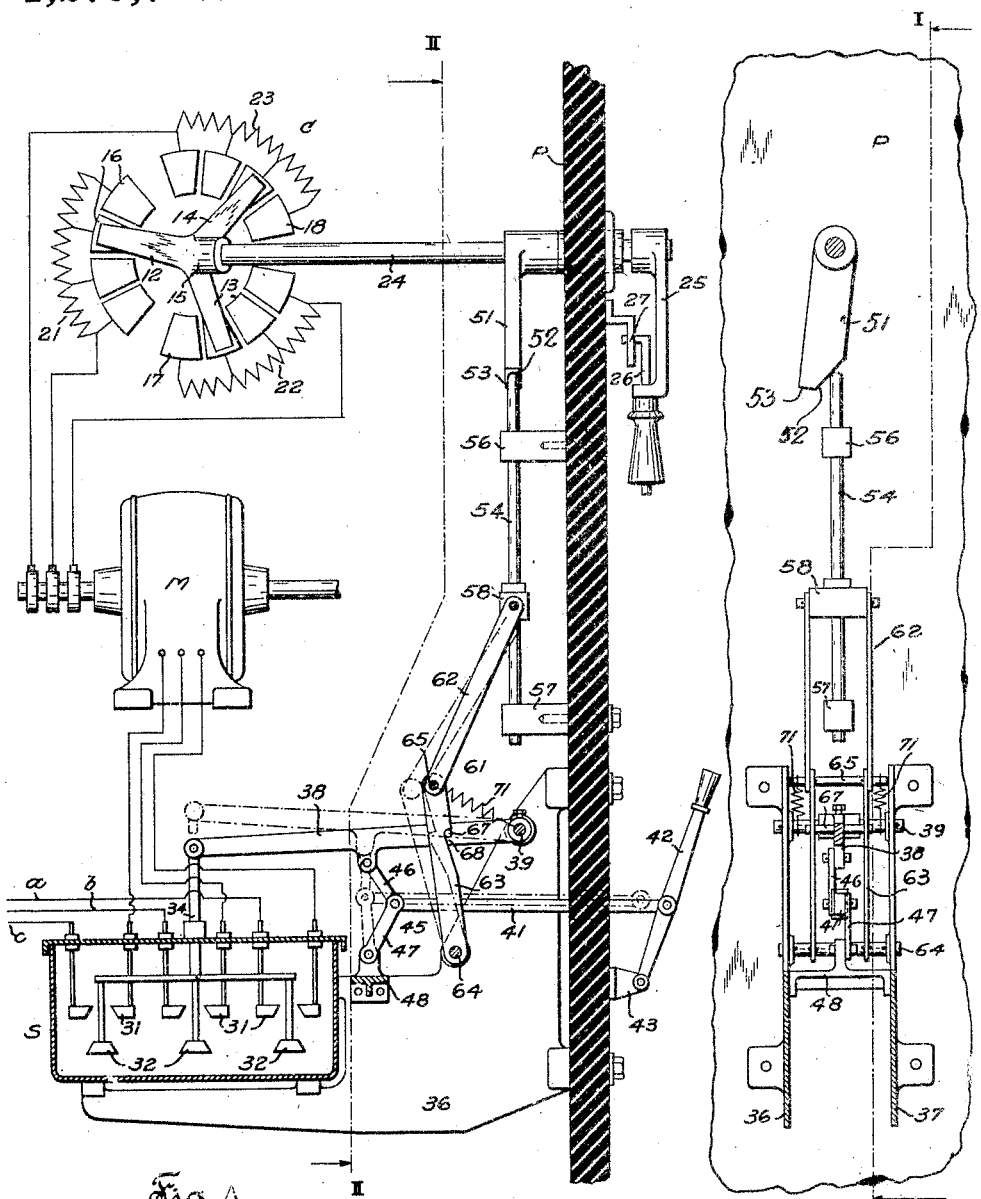
Fig. 1.
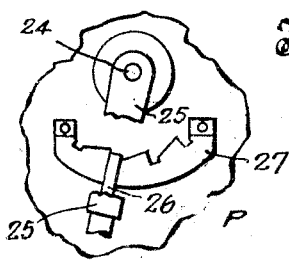
Fig. 3.
Fig. 2.
Inventor
E. Tobiessen
by
Attorney

UNITED STATES PATENT OFFICE.

EMANUEL TOBIESSEN, OF WEST ALLIS, WISCONSIN, ASSIGNOR TO ALLIS-CHALMERS MANUFACTURING COMPANY, OF MILWAUKEE, WISCONSIN, A CORPORATION OF DELAWARE.

MOTOR-CONTROLLER.

1,279,790.  Specification of Letters Patent.  Patented Sept. 24, 1918.

Application filed July 24, 1915. Serial No. 42,103.

*To all whom it may concern:*

Be it known that I, EMANUEL TOBIESSEN, a citizen of the United States, residing at West Allis, in the county of Milwaukee and State of Wisconsin, have invented a certain new and useful Improvement in Motor-Controllers, of which the following is a specification.

This invention relates in general to control devices for electric circuits and has particular relation to control devices that are especially adapted for use in controlling the primary and secondary circuits of induction motors.

In operating induction motors of the wound secondary type, it is highly desirable, in order to protect the windings against the passage of dangerously heavy currents during the starting of the motor, that means be provided for preventing the closure of the primary circuit unless a considerable amount of resistance is included in the secondary circuit.

It is an object of this invention to provide an improved control device for induction motors comprising coöperative primary and secondary control elements that accomplish the desired control and, at the same time, serve to fully protect the motor.

It is a further object of this invention to provide improved control apparatus of this character effective to insure that the primary control element can be operated to closed position only when the secondary control element is in proper position to secure safe operation of motor during the starting period.

These and other objects are attained by this invention, the various novel features of which will appear from the description and drawings, disclosing one embodiment of such invention, and will be particularly pointed out in the claims.

In the accompanying drawings:

Figure 1 is a partially diagrammatic view of an induction motor and control apparatus therefor, the primary control element and the actuating devices for the primary and secondary control elements being shown in sectional elevation along the line I—I of Fig. 2.

Fig. 2 indicates a section along the line II—II of Fig. 1.

Fig. 3 is a partial elevation of the apparatus of Fig. 1, looking from the front side of the panel.

In accordance with the illustrated disclosure, an induction motor M, here shown as being of the three-phase type, is supplied from the mains $a$, $b$, $c$, a three-pole switch S being inserted for controlling the primary circuit of the motor. A controller C, of the three-phase type, is connected in the secondary circuit of the motor, the controller comprising three conducting arms 12, 13 and 14, electrically connected through a supporting element 15, preferably integral therewith, and operative to engage sets of contact segments 16, 17 and 18, respectively, which are mounted on a suitable support and are connected to resistance sections 21, 22 and 23, respectively, the contact arms 12, 13 and 14 being operative, in their movement in an anti-clockwise direction across the segments 16, 17 and 18, respectively, to short-circuit sections of the resistance elements 21, 22 and 23, respectively. The supporting element 15 carrying the contact arms 12, 13 and 14 is shown mounted on an operating rod 24 which passes through a control panel P, a suitable bearing for the rod being provided in the panel, and an operating handle 25 for the rod being provided on the front side of the panel, the handle being provided with a latch 26 engageable with a series of ratchet stops on a member 27 suitably mounted on the front side of the panel. The controller C is shown in a position removed by one segment from initial or resistance-in position, that is, the position normally occupied by the controller when the motor is at rest, a maximum amount of resistance being included in the circuit of the secondary winding of the motor at this time.

The primary controlling switch S preferably comprises contacts suitably mounted in a receptacle and immersed in oil therein, the fixed contacts 31 being arranged in pairs, one contact of each pair being connected to one side of the circuit $a$, $b$, $c$, and the other contact of each pair being connected to one of the terminals of the primary winding of the motor M, and the movable contacts 32 being in the form of bridging elements adapted to connect the several pairs of fixed contacts 31 to thereby establish a connection between the primary circuit of the motor and the supply circuit a, b, c. The movable bridging elements 32 are suitably connected for simultaneous operation by a reciprocating actuating rod 34 which enters the receptacle in which the contacts are mounted, this receptacle being shown mounted on a fixed support, preferably in the form of two parallel castings or plates 36 and 37 disposed at right angles to the panel P and secured thereto at the rear side thereof.

The rod 34 is actuated by an arm 38 pivotally secured to the plates 36 and 37, as through a rod or pin 39 pivotally mounted in these plates. The arm 38 is actuated by a rod 41 which passes through the panel P to the front side thereof, being there connected to an operating arm 42 pivotally mounted on a fixed support 43 secured on the front side of the panel, the connection between the rod 41 and the arm 38 being through a toggle 45 comprising links 46 and 47, the former being pivotally connected to the arm 38 and the latter being pivotally connected to a fixed point, as on an extension of an element 48 secured to the plates 36 and 37, the rod 41 being pivotally connected to the knee of the toggle. The full line position of the actuating mechanism for the primary switch, in Fig. 1, indicates switch-open condition. The switch is closed by actuation of the operating arm 42 in an anti-clockwise direction, this actuation reciprocating the rod 41 to straighten out the toggle 45 and move the operating arm 38 in a clockwise direction to thus reciprocate the rod 34 which operates the bridging elements 32 to switch-closed position. With the switch in closed position, the actuating mechanism therefor occupies the position indicated in dotted lines in Fig. 1, the axis of the knee of the toggle 45 occupying a position slightly beyond the center line of the pivotal points of connection of the link 46 to the arm 38 and the link 47 to the element 48, the parts being thus held securely against accidental operation tending to open the switch.

Mounted on the rod 24 which serves to actuate the controller C and immediately adjacent the rear side of the panel P is an arm 51 securely fixed to the rod and provided at its outer end with a cam portion 52 terminating in a squared end portion 53. A rod 54 is slidably mounted in guides 56 and 57 secured to the rear side of the panel P, the rod being movable into the path of movement of the outer end of the arm 51. Secured to the rod 54 is a saddle or cross-head 58, this element being loosely connected to a fixed point, as one or both of the supporting plates 36 and 37, through a toggle 61 comprising pivotally connected pairs of arms 62 and 63, the former being pivotally connected to the element 58 and the latter being pivotally connected to the plates 36 and 37, as through a pin or rod 64 pivotally mounted in the plates 36 and 37, and the links being pivotally connected together as through a pin or rod 65. The arm 38 is provided with a pin 67 extending from opposite sides thereof and engageable in recesses 68 in the links 63, between which links the operating arm 38 extends. The toggle 61 is held in such position that the pin 67 is retained in recesses 68 by means of a spring 71 secured at one end to the pin 39 and at the other end to the pin 65. With the pin 67 held in the recesses 68, it will be apparent that the arm 38 is prevented from movement in a clockwise direction, that is, such movement as causes closing of the switch. It will be apparent also that through the toggle 61 and its biasing spring 71, the upper end of the rod 54 is resiliently urged into the path of the arm 51.

The toggle, as far as its effect is concerned, may be regarded as essentially the link 62 constrained at one end by any member, here shown as link 63, to move at said end substantially transversely to its length; or it may be considered essentially the link 63 which swings about pivot 64 thus raising the other pivot-end 65, this motion being transmitted in any manner to the rod 54 to be raised, as by link 62. In the construction illustrated the effects of the two links 62, 63 are, of course, added. One of the advantages of a construction producing a toggle effect, either double or single, is that friction in the guides 56 is more certainly overcome and a smaller spring 71 may be used.

When the controller C is in initial or resistance-in position, that is, with the arms 12, 13 and 14 on the first of the segments 16, 17 and 18, respectively, the element 51 is in such position that the upper end of the rod 54 is in engagement with the squared end portion 53, at which time the rod is urged by the element 51 to a position whereon the toggle 61 is shifted toward collapsed position, this position being indicated in dotted lines in Fig. 1. With the parts in this position, it will be apparent that the links 63 are so positioned that the pin 67 is free of the recesses 68 in such links. With the toggle in this latter position, it will be apparent that there is nothing to prevent such actuation of the arm 38 as causes operation of the switch S to closed position. The switch S having been closed, the controller C can be actuated to remove resistance from the secondary circuit of the motor to bring the same up to operating speed. On such operation of the controller and the consequent removal of the element 51 from engagement with the upper end of the rod 54, the toggle 61 is drawn toward straightened position by the spring 71. Subsequent operation of the switch S to open position, while the controller C is in other than initial or full resistance-in position, will cause the engagement of the pin 67 in the recesses 68 to prevent subsequent closure of the switch for motor starting purposes, until the controller C has been actuated to initial or full resistance-in position, at which time the links 63 are moved out of latching engagement with the pin 67, through the engagement of the cam portion 52 of the element 51 with the upper end of the rod 54.

It will be apparent that the closure of the primary switch S can be effected only when the resistance of the secondary circuit is a maximum, the controller C, when in other than full resistance-in position, acting through the interlock to prevent the starting of the motor except under proper operating conditions; and that, in accordance with this invention, the primary and secondary control elements are so interlocked as to permit desirable operation and to prevent any undesirable operation thereof in controlling the motor.

The term toggle is used in the claims for the sake of brevity and is intended to define any device producing a toggle effect. Such an effect may be secured by a link operatively related to other members and so constrained that the application to said link of a relatively small force in a predetermined direction will result in the production of a relatively large force in a direction transverse to the first named direction.

It should be understood that it is not desired that this invention, as claimed, be limited to the exact details of construction shown and described, for obvious modifications will occur to a person skilled in the art.

It is claimed and desired to secure by Letters Patent:

1. In a system for controlling alternating current induction motors of the type having primary and secondary windings, a controlling switch adapted to be connected in the circuit of the primary winding, actuating means for said switch, a controller adapted to be associated with the circuit of the secondary winding, said controller being operative to insert resistance in and remove resistance from the circuit of said secondary winding, and latch means comprising a toggle resiliently urged to a position wherein an element thereof coöperates with a part associated with the actuating means for said switch when said toggle is moved toward straightened position to prevent closure of said switch unless said controller is in a certain position.

2. In a system for controlling alternating current induction motors of the type having primary and secondary windings, a controlling switch adapted to be connected in the circuit of the primary winding, means for actuating said switch, a controller adapted to be associated with the circuit of the secondary winding, said controller being operative to insert resistance in and remove resistance from the circuit of said secondary winding, interlocking means between said switch and said controller comprising a toggle and an element associated with the actuating means for said primary switch, a rod for actuating said toggle, and a cam element operable by said secondary controller for actuating said rod, said latch means being effective to hold said switch against closure and operable by said controller through said cam element and said rod to release said switch and permit closure thereof.

3. In a system for controlling alternating current induction motors of the type having primary and secondary windings, a controlling switch adapted to be connected in the circuit of said primary windings, a controller operable to insert resistance in or to remove resistance from the circuit of said secondary winding, a panel, actuating means for said primary switch and said secondary controller comprising parts mounted on the front side of said panel, latch means disposed at the rear of said panel and comprising a toggle including a recessed link coöperative with an element associated with the actuating means for said primary switch, said toggle being biased to position wherein it holds said primary switch against closure, a rod for actuating said toggle slidably mounted at the rear of said panel, and a cam element operable by said secondary controller to cause such actuation of said rod as causes said toggle to move to a position wherein closure of said primary switch is permitted.

4. In combination, a controlling device, a switch, actuating mechanism for said controlling device and said switch, and an interlock between said controlling device and said switch, said interlock comprising a toggle including a recessed link coöperative with an element associated with the actuating mechanism for said switch and biased to a position wherein said switch is held against closure, a rod for actuating said toggle and a cam element actuatable by said controlling device when in a certain position for actuating said rod to cause operation of said toggle to a position wherein closure of said switch is permitted.

5. In a controlling apparatus for electric motors, a controlling switch adapted to be connected in a circuit of the motor, actuating means for said switch, a controller operative to insert resistance in and remove resistance from a circuit of said motor, and latch means comprising a toggle resiliently urged to a position wherein an element thereof coöperates with a part associated with the actuating means for said switch when said toggle is moved toward straightened position to prevent closure of said switch unless said controller is in a certain position.

6. In a controlling apparatus for electric motors, a controlling switch adapted to be connected in a circuit of the motor, means for actuating said switch, a controller operative to insert resistance in and remove resistance from a circuit of said motor, interlocking means between said switch and said controller comprising a toggle and an element associated with the actuating means for said switch, a rod for actuating said toggle, and a cam element operable by said controller for actuating said rod, said toggle being effective to hold said switch against closure and operable by said controller through said cam element and said rod to release said switch and permit closure thereof.

7. In a controlling apparatus, a switch, a resistance-varying controller, a panel, actuating means for said switch and said controller comprising parts mounted on the front side of said panel, latch means disposed at the rear of said panel and comprising a toggle including a recessed link coöperative with an element associated with the actuating means of said switch, said toggle being biased to a position wherein it holds said switch against closure, a rod for actuating said toggle and slidably mounted at the rear of said panel, and a cam element operable by said controller to cause such actuation of said rod as causes said toggle to move to a position wherein closure of said switch is permitted.

8. In a controlling apparatus, the combination of a switch, means for actuating said switch, a resistance-varying controller, means for actuating said controller, and means for preventing actuation of said switch to one of its positions except when said controller is in a certain position, said preventing means comprising a locking toggle associated with the actuating means for said switch and biased to a position wherein it locks said switch against actuation, and an operative connection between said toggle and the actuating means for said controller, said operative connection comprising a reciprocating rod guided in its movement and mechanically associated with said toggle and actuatable by the actuating means for said controller.

9. In a controlling apparatus, a switch, a controller, a panel, said switch and said controller being located at the rear of said panel, actuating means for said switch and said controller comprising manipulable parts mounted on the front side of said panel, and operating parts passing through said panel and connected with said switch and controller respectively, means for locking said switch against actuation to one of its operative positions except when said controller is in a certain position, said locking means comprising a locking toggle biased to a position wherein it effectively prevents actuation of said switch, and an operative connection between said toggle and the actuating means for said controller, said operative connection comprising a reciprocating rod guided in its movement, and said locking means and said operative connection being mounted at the rear of said panel.

In testimony whereof, the signature of the inventor is affixed hereto.

EMANUEL TOBIESSEN.